(12) United States Patent
Choi et al.

(10) Patent No.: US 9,419,255 B2
(45) Date of Patent: Aug. 16, 2016

(54) SECONDARY BATTERY

(75) Inventors: Kyugil Choi, Yongin-si (KR); Changbum Ahn, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1187 days.

(21) Appl. No.: 12/942,943

(22) Filed: Nov. 9, 2010

(65) Prior Publication Data

US 2011/0117426 A1 May 19, 2011

(30) Foreign Application Priority Data

Nov. 18, 2009 (KR) ........................ 10-2009-0111454

(51) Int. Cl.
| | | |
|---|---|---|
| *H01M 2/02* | (2006.01) | |
| *H01M 2/04* | (2006.01) | |
| *H01M 2/06* | (2006.01) | |
| *H01M 2/30* | (2006.01) | |

(52) U.S. Cl.
CPC ............ *H01M 2/021* (2013.01); *H01M 2/0212* (2013.01); *H01M 2/0404* (2013.01); *H01M 2/06* (2013.01); *H01M 2/30* (2013.01); *H01M 2/0217* (2013.01)

(58) Field of Classification Search
CPC . H01M 2/021; H01M 2/0212; H01M 2/0217; H01M 2/0404; H01M 2/06; H01M 2/30
USPC ......................................... 429/163–178, 186
See application file for complete search history.

(56) References Cited

U.S. PATENT DOCUMENTS

| | | | |
|---|---|---|---|
| 6,743,546 B1 | 6/2004 | Kaneda et al. | |
| 2006/0019160 A1 | 1/2006 | Han | |
| 2006/0093905 A1* | 5/2006 | Kim .................... | H01M 2/021 429/175 |
| 2006/0266542 A1* | 11/2006 | Yoon ............................. | 174/112 |
| 2007/0184341 A1* | 8/2007 | Yoon et al. .................... | 429/152 |
| 2009/0081485 A1* | 3/2009 | Heo .................................. | 429/7 |

FOREIGN PATENT DOCUMENTS

| | | |
|---|---|---|
| EP | 2117064 | 11/2009 |
| EP | 2237342 | 10/2010 |
| JP | 2-21557 | 1/1990 |

(Continued)

OTHER PUBLICATIONS

KIPO Notice of Allowance dated Nov. 16, 2011 for priority Korean application 10-2009-0111454, 5 pages.

(Continued)

*Primary Examiner* — Milton I Cano
*Assistant Examiner* — Ling R Zeng
(74) *Attorney, Agent, or Firm* — Lewis Roca Rothgerber Christie LLP

(57) ABSTRACT

A secondary battery includes an electrode assembly, a support body receiving the electrode assembly, and an external member coupled to the support body, wherein the support body and the external member together enclose the electrode assembly. Another secondary battery includes an electrode assembly including a first electrode plate and a second electrode plate; and a support body receiving the electrode assembly and including a body and a terminal forming part, wherein the terminal forming part is provided with a first electrode terminal electrically connected to the first electrode plate and a second electrode terminal electrically connected to the second electrode plate, and the terminal forming part is integrally formed with the body.

12 Claims, 8 Drawing Sheets

(56) References Cited

FOREIGN PATENT DOCUMENTS

| | | |
|---|---|---|
| JP | 2002-042775 A | 2/2002 |
| JP | 2003-7344 A | 1/2003 |
| JP | 2006-93120 A | 4/2006 |
| JP | 2007-095466 A | 4/2007 |
| JP | 2008-027616 | 2/2008 |
| JP | 2009-158440 A | 7/2009 |
| KR | 10-20070075707 A | 7/2007 |
| KR | 2008-0037868 A | 5/2008 |
| WO | WO 00/59063 | 10/2000 |
| WO | WO 2007/091759 | 8/2007 |

OTHER PUBLICATIONS

Korean Office Action dated Mar. 28, 2011 issued by the KIPO corresponding to the Korean Patent Application No. 10-2009-0111454, 3 pages.

English Machine Translation of Japanese Publication JP 2003-7344 A, listed above, 16 pages.

English Machine Translation of Japanese Publication JP 2009-158440 A, listed above, 18 pages.

Office Action dated Sep. 4, 2012, issued in Japanese Application 2010-012959, 2 pages.

EP Search Report in the name of Samsung SDI Co., Ltd. dated Mar. 2, 2011, EP Application No. 10251959.2.

\* cited by examiner

SECONDARY BATTERY

CROSS-REFERENCE TO RELATED APPLICATION

This application claims priority to and the benefit of Korean Patent Application No. 10-2009-0111454, filed on Nov. 18, 2009, the entire content of which is incorporated herein by reference.

BACKGROUND

1. Field

Aspects of embodiments of the present invention relate to a secondary battery.

2. Description of the Related Art

Recently, as electronic industrials, communication industrials, and computer industrials are rapidly developed, portable electronic appliances are being widely used. In addition, rechargeable secondary batteries are being typically used as power sources of portable electronic appliances.

In general, a secondary battery includes a case configured to receive an electrode assembly. Such secondary batteries are classified into can-type secondary batteries, including prismatic-type aluminum cans and pouch-type aluminum cans including thin pouches, according to the types of cases. The case of a can-type secondary battery is formed by welding a cap plate to an opening of a can, and the case of a pouch-type secondary battery is formed by heat-welding the edges of two sheets.

SUMMARY

According to aspects of embodiments of the present invention, a secondary battery substantially overcomes one or more of the problems due to the limitations and disadvantages of the related art.

According to an aspect of embodiments of the present invention, a secondary battery includes a support body receiving an electrode assembly.

According to another aspect of embodiments of the present invention, a secondary battery has a simple structure.

According to another aspect of embodiments of the present invention, a secondary battery has improved sealing performance.

According to one embodiment of the present invention, a secondary battery includes: an electrode assembly; a support body receiving the electrode assembly; and an external member coupled to the support body, and the support body and the external member together enclose the electrode assembly.

The secondary battery may further include an adhesive coupling the external member to the support body.

The support body may have a first adhesive groove configured to receive the adhesive. The support body may have a second adhesive groove substantially parallel to the first adhesive groove.

A width of a first part of the support body where the adhesive is located thereon may be less than a width of a second part of the support body where the support body is coupled to the external member.

The second part of the support body may include a portion without the adhesive thereon, the portion of the second part being coupled to the external member through heat welding and adhesive.

The support body may include a base portion, a first wing portion, and a second wing portion, and the first and second wing portions may extend from opposite ends of the base portion and face each other. The first and second wing portions may be substantially perpendicular to the base portion.

An end of the first wing portion may have a rounded edge, and an end of the second wing portion may have a rounded edge.

The electrode assembly may include first and second ends opposite each other, and first and second sides connecting the first and second ends to each other, and the support body may have a tetragonal shape surrounding the first and second ends and the first and second sides of the electrode assembly.

An inner surface of the support body may have a seat recess in which a portion of the electrode assembly is received. The seat recess may have a rounded outer edge.

The external member may have a sheet shape. In one embodiment, the external member includes a first portion having a sheet shape and a second portion substantially parallel to the first portion and having a sheet shape. The external member may further include a third portion substantially perpendicular to and connecting the first and second portions and having a sheet shape.

According to another embodiment of the present invention, a secondary battery includes: an electrode assembly including a first electrode plate and a second electrode plate; and a support body receiving the electrode assembly and including a body and a terminal forming part, wherein the terminal forming part is provided with a first electrode terminal electrically connected to the first electrode plate and a second electrode terminal electrically connected to the second electrode plate, and the terminal forming part is integrally formed with the body.

The terminal forming part may include: a first terminal part including a first sealing part that surrounds the first electrode terminal and is integrally formed with the body; and a second terminal part including a second sealing part that surrounds the second electrode terminal and is integrally formed with the body.

The first sealing part and the second sealing part may have higher melting temperatures than a melting temperature of the body.

The first terminal part may include a first terminal adhesive layer between the first sealing part and the first electrode terminal, and the second terminal part may include a second terminal adhesive layer between the second sealing part and the second electrode terminal.

The terminal forming part may include a sealing part surrounding both the first and second electrode terminals and integrally formed with the body. The sealing part may have a higher melting temperature than a melting temperature of the body.

The support body may include a body adhesive layer between the terminal forming part and the body.

The body adhesive layer may include a same material as a material of the body.

The first electrode terminal may include a first inner connection part extending from the body to the electrode assembly, and the second electrode terminal may include a second inner connection part extending from the body to the electrode assembly.

The body may have a storage recess in which the first and second inner connection parts are bent and stored.

BRIEF DESCRIPTION OF THE DRAWINGS

The above and other features and advantages will become more apparent to those of ordinary skill in the art by describing in detail some exemplary embodiments of the present invention with reference to the attached drawings, in which.

DETAILED DESCRIPTION

Some exemplary embodiments will now be described more fully hereinafter with reference to the accompanying drawings; however, embodiments of the present invention may be embodied in different forms and should not be construed as limited to the exemplary embodiments illustrated and set forth herein. Rather, these exemplary embodiments are provided by way of example for understanding of the invention and to convey the scope of the invention to those skilled in the art.

A secondary battery according to one exemplary embodiment will be described in detail with reference to FIGS. 1 through 8.

Figure 1:
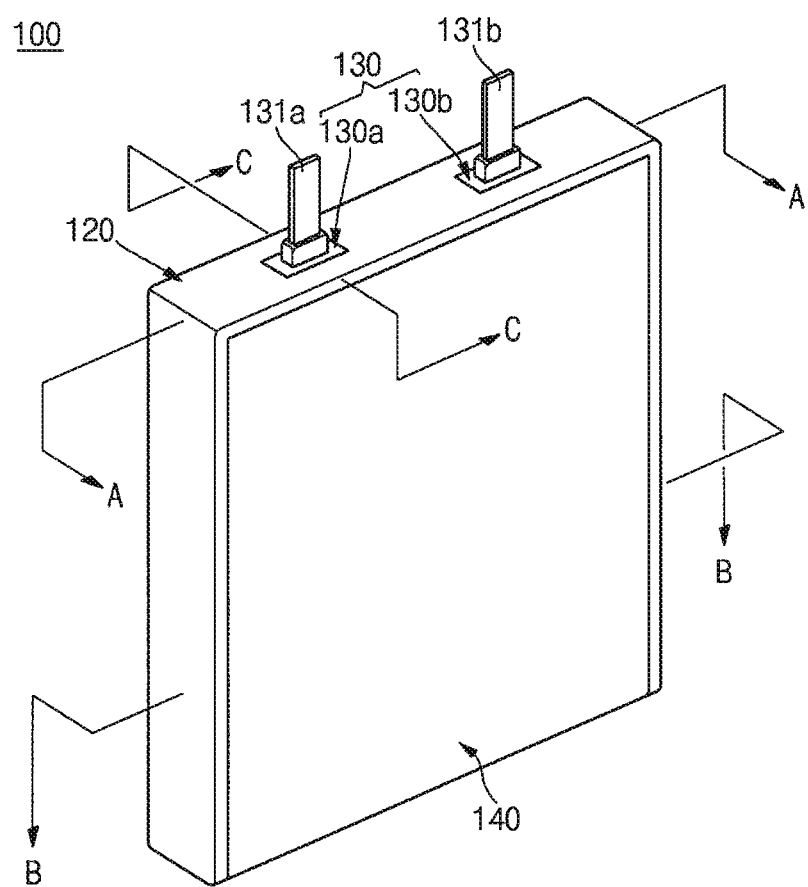
FIG. 1 is a perspective view of a secondary battery according to an embodiment of the present invention.
Figure 2:
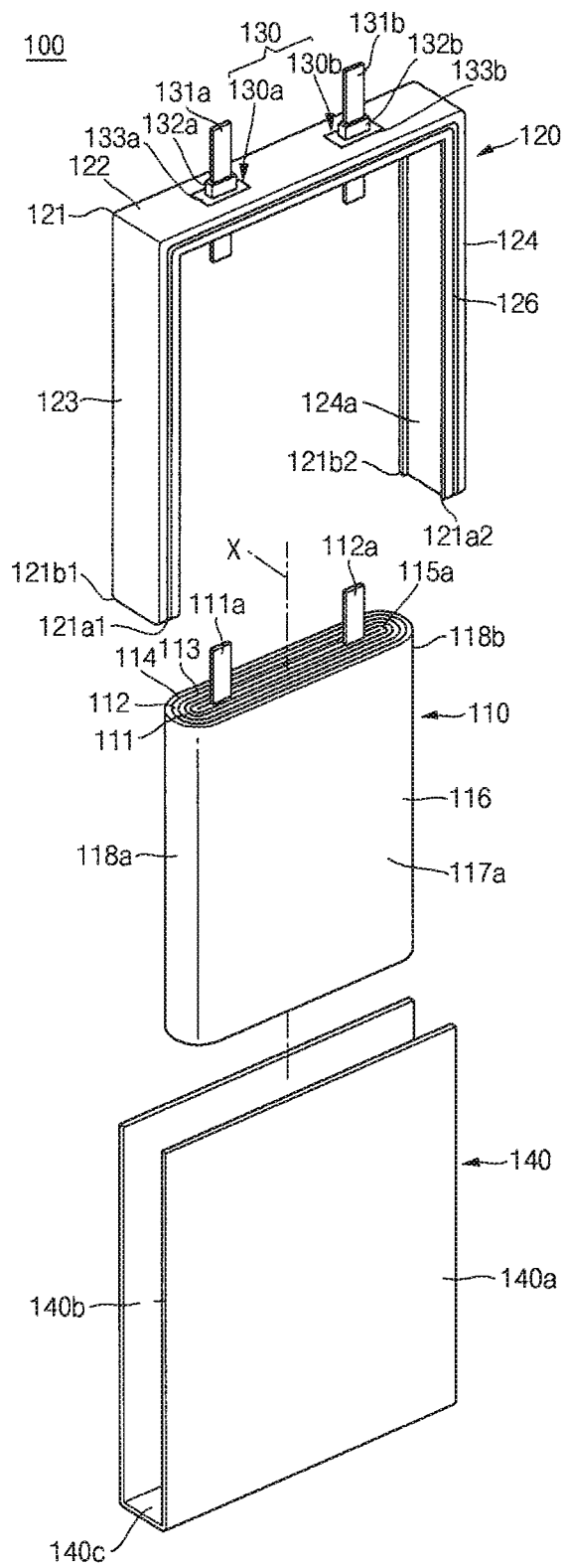
FIG. 2 is an exploded perspective view of the secondary battery of FIG. 1.
Figure 3:
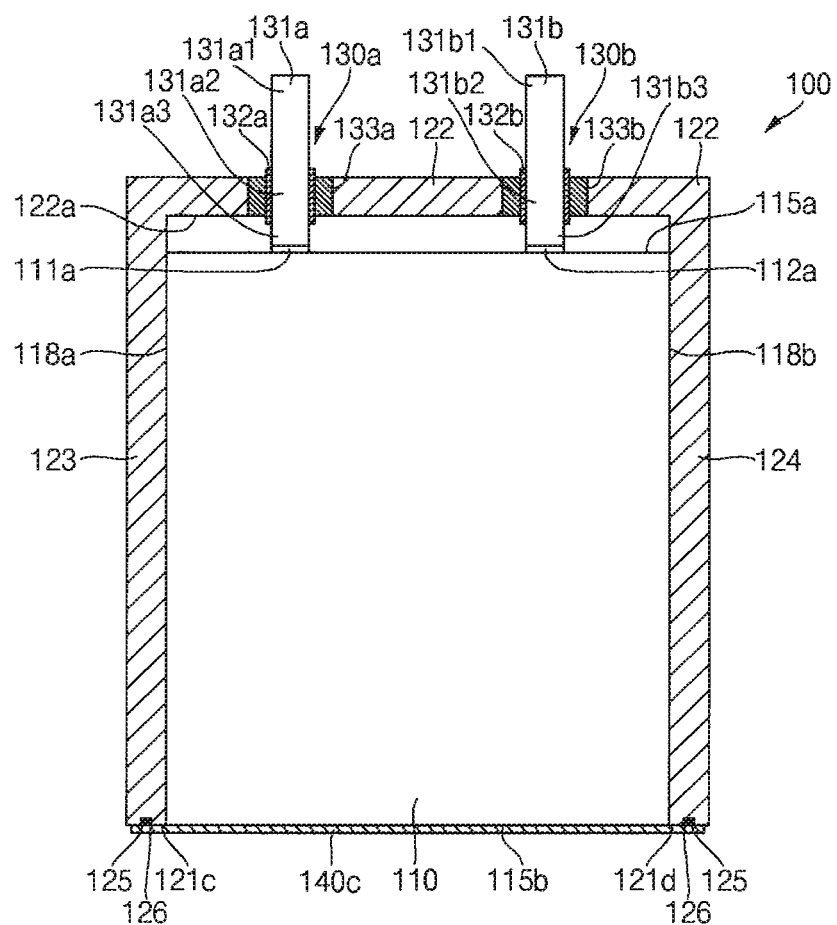
FIG. 3 is a cross-sectional view of the secondary battery of FIG. 1 taken along line A-A.
Figure 4:
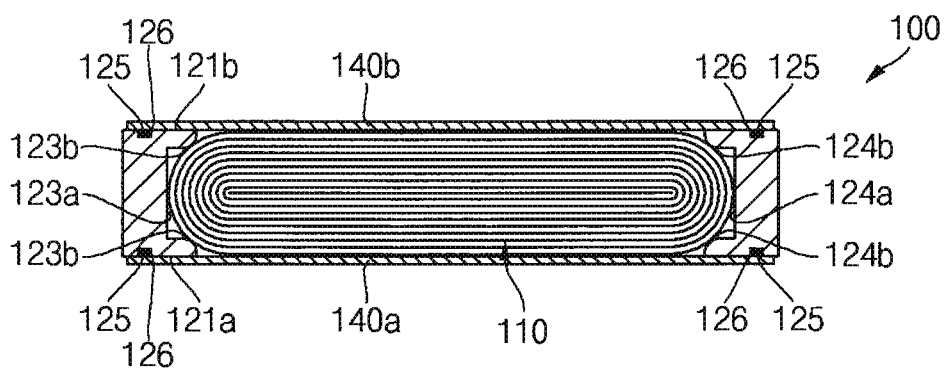
FIG. 4 is a cross-sectional view of the secondary battery of FIG. 1 taken along line B-B.
Figure 5:
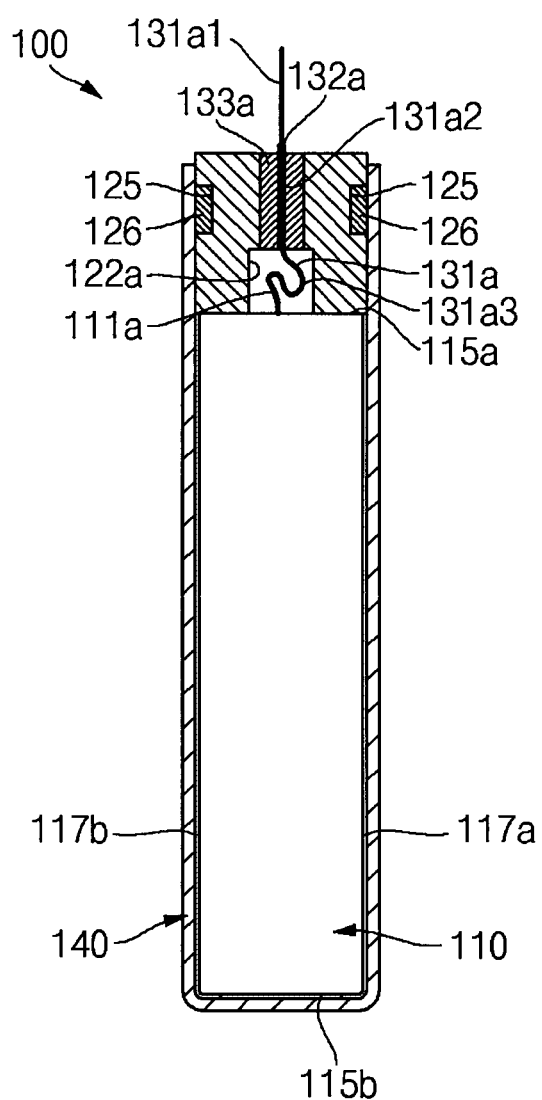
FIG. 5 is a cross-sectional view of the secondary battery FIG. 1 taken along line C-C.
Figure 6:
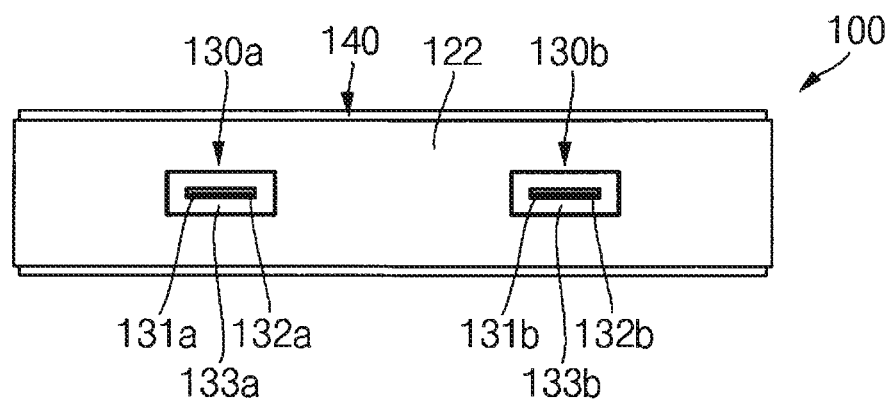
FIG. 6 is a plan view of the secondary battery of FIG. 1.
Figure 7:
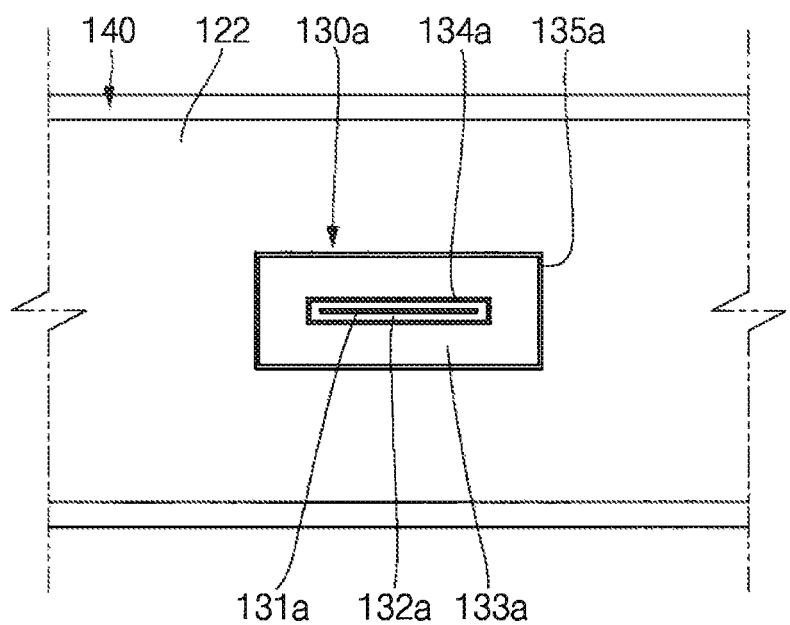
FIG. 7 is a partial enlarged view of a surrounding of a first sealing part of the secondary battery of FIG. 1.
Figure 8:
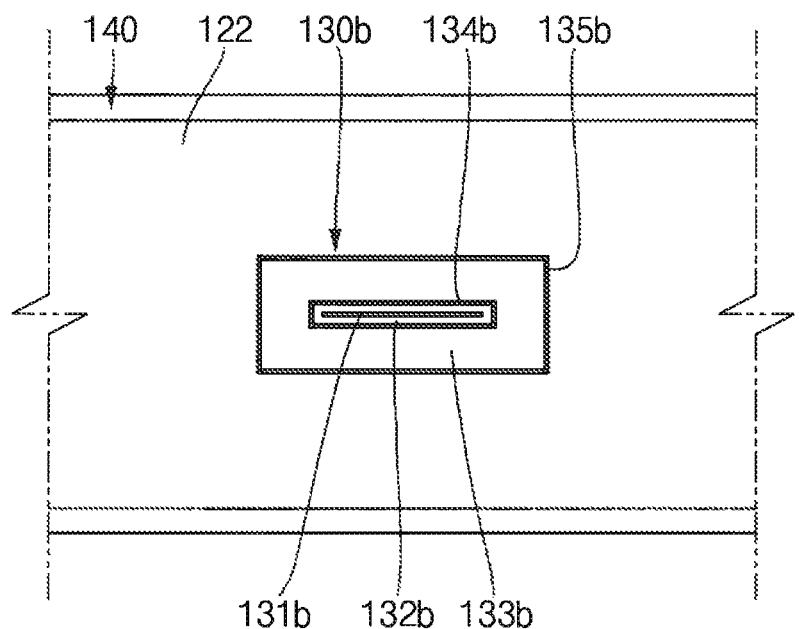
FIG. 8 is a partial enlarged view of a surrounding of a second sealing part of the secondary battery of FIG. 1.

FIG. 1 is a perspective view of a secondary battery according to an embodiment of the present invention. FIG. 2 is an exploded perspective view of the secondary battery of FIG. 1. FIG. 3 is a cross-sectional view of the secondary battery of FIG. 1 taken along line A-A. FIG. 4 is a cross-sectional view of the secondary battery of FIG. 1 taken along line B-B. FIG. 5 is a cross-sectional view of the secondary battery of FIG. 1 taken along line C-C. FIG. 6 is a plan view of the secondary battery of FIG. 1. FIG. 7 is a partial enlarged view of a surrounding of a first sealing part of the secondary battery of FIG. 1. FIG. 8 is a partial enlarged view of a surrounding of a second sealing part of the secondary battery of FIG. 1.

Referring to FIGS. 1 through 5, a secondary battery 100 includes an electrode assembly 110, a support body 120, and an external member 140. The secondary battery 100 is configured to store electrical energy supplied from a charger (not shown), and supply the stored electrical energy to an external load (not shown).

The electrode assembly 110, in one embodiment, has a thin and wide shape (e.g., a flattened shape) and includes a first electrode plate 111, a second electrode plate 112, and separators 113 and 114 disposed between the first electrode plate 111 and the second electrode plate 112. The electrode assembly 110, in one embodiment, has a wound jelly roll shape. The electrode assembly 110 includes a first end 115a and a second end 115b disposed at opposite ends along a winding center line X, and a side surface 116 connecting the first and second ends 115a and 115b. The wound first and second electrode plates 111 and 112 and the separators 113 and 114 are exposed at the first and second ends 115a and 115b in one embodiment. The side surface 116 includes first and second long side surfaces 117a and 117b disposed on opposite sides, and first and second short side surfaces 118a and 118b disposed on opposite sides and connecting the first and second long side surfaces 117a and 117b. The long side surfaces 117a and 117b, in one embodiment, are longer than the short side surfaces 118a and 118b along a winding direction. The long side surfaces 117a and 117b are generally flat, and the short side surfaces 118a and 118b are rounded (e.g., convexly rounded outward from the winding center line X).

The first electrode plate 111, in one embodiment, is coupled with a conductive first electrode tab 111a, and the second electrode plate 112 is similarly coupled with a conductive second electrode tab 112a. The first electrode tab 111a and the second electrode tab 112a, in one embodiment, protrude from the first end 115a of the electrode assembly 110. In one embodiment, the first electrode plate 111 is a positive electrode plate, and the second electrode plate 112 is a negative electrode plate. Accordingly, the first electrode tab 111a is a positive tab, and the second electrode tab 112a is a negative tab. However, the present invention is not limited thereto. For example, the first electrode plate 111 may be a negative electrode plate, and the second electrode plate 112 may be a positive electrode plate. Accordingly, the first electrode tab 111a may be a negative tab, and the second electrode tab 112a may be a positive tab.

The support body 120 includes a body 121 and a terminal forming part 130. The support body 120 receives the electrode assembly 110, provides structural support in the secondary battery 100, and provides terminals. The support body 120 may be formed using a method such as double injection. That is, the support body 120 may be fabricated by sequentially forming the terminal forming part 130 and the body 121 in a double injection machine.

The body 121, in one embodiment, includes a base part 122, a first wing part 123, a second wing part 124, and a first adhesive groove 125. The body 121 surrounds or partially surrounds the electrode assembly 110 and provides structural support to the secondary battery 100. In one embodiment, the body 121 surrounds the electrode assembly 110 on three sides. In one embodiment, the body 121 is formed of an insulating material, such as polypropylene (PP).

The base part 122, in one embodiment, has a bar shape extending along a first direction and covers the first end 115a of the electrode assembly 110. The base part 122, in one embodiment, is provided with the terminal forming part 130. Further, in one embodiment, the base part 122 includes a storage recess 122a (see FIG. 5) facing the first end 115a of the electrode assembly 110. The first and second electrode tabs 111a and 112a of the electrode assembly 110 are bent and stored in the storage recess 122a. In addition, electrolyte may be stored in the storage recess 122a. The first and second wing parts 123 and 124 are connected to opposite ends of the base part 122 along the longitudinal direction of the base part 122.

The first wing part 123, in one embodiment, has an elongated bar shape or rod shape and extends in a second direction that is approximately perpendicular to the base part 122. The first wing part 123, in one embodiment, covers the first short side surface 118a of the electrode assembly 110. Further, the first wing part 123, in one embodiment, includes a first seat recess 123a facing the first short side surface 118a of the electrode assembly 110. At least a portion (e.g., a convex portion) of the first short side surface 118a of the electrode assembly 110 is inserted into the first seat recess 123a. The first seat recess 123a fixes the electrode assembly 110 in at least one direction and provides a space for receiving electrolyte. Outer edges 123b of the first seat recess 123a are rounded in one embodiment to protect the electrode assembly 110.

The second wing part 124, in one embodiment, has an elongated bar shape or rod shape and extends in the second direction that is approximately perpendicular to the base part 122 and parallel to the first wing part 123. The second wing part 124, in one embodiment, covers the second short side surface 118b of the electrode assembly 110. Further, in one embodiment, the second wing part 124 is provided with a second seat recess 124a facing the second short side surface 118b of the electrode assembly 110. At least a portion (e.g., a convex portion) of the second short side surface 118b of the electrode assembly 110 is inserted into the second seat recess 124a. The second seat recess 124a fixes the electrode assembly 110 in at least one direction and provides a space for receiving electrolyte. Outer edges 124b of the second seat recess 124a are rounded in one embodiment to protect the electrode assembly 110.

The first adhesive groove 125 receives an adhesive 126 and, in one embodiment, extends on the body 121 along a first surface 121a, a second surface 121b, a first end surface 121c, and a second end surface 121d. The first surface 121a of the body 121 and the first long side surface 117a of the electrode assembly 110 face a same direction as one another. Similarly, the second surface 121b of the body 121 and the second long side surface 117b of the electrode assembly 110 face a same direction as one another that is opposite the direction in which the first surface 121a and the first long side surface 117a of the electrode assembly 110 face. The first and second surfaces 121a and 121b of the body 121, in one embodiment, each include portions of the base part 122, the first wing part 123, and the second wing part 124. The first end surface 121c of the body 121 is an end surface of the first wing part 123, and the second end surface 121d of the body 121 is an end surface of the second wing part 124. Edges 121a1, 121a2, 121b1, and 121b2 where the first and second surfaces 121a and 121b are connected to the first and second end surfaces 121c and 121d are rounded in one embodiment to protect the external member 140. The external member 140, in one embodiment, is attached to the body 121 through the adhesive 126.

The terminal forming part 130, in one embodiment, is integrally formed with the body 121, and includes a first terminal part 130a and a second terminal part 130b. The terminal forming part 130, in one embodiment, is disposed in the base part 122 of the body 121, and provides terminals of the secondary battery 100.

The first terminal part 130a includes a first electrode terminal 131a and a first sealing part 133a, and supports the first electrode terminal 131a in the body 121.

The first electrode terminal 131a, in one embodiment, includes a long, thin metal plate. The first electrode terminal 131a, in one embodiment, is electrically connected to the first electrode tab 111a that is a positive electrode tab, so that the first electrode terminal 131a functions as a positive terminal of the secondary battery 100.

The first electrode terminal 131a includes a first outer connection part 131a1, a first insulated part 131a2, and a first inner connection part 131a3 that are sequentially located along a longitudinal direction of the first electrode terminal 131a. The first outer connection part 131a1 extends from the base part 122 of the body 121 to a side opposite the electrode assembly 110, so that the first outer connection part 131a1 can be electrically connected to a protective circuit part (not shown). In one embodiment, a first insulating tape 132a is wound around the first insulated part 131a2 (e.g., between the first insulated part 131a2 and the base part 122 of the body 121) for insulating. The first inner connection part 131a3 extends from the base part 122 of the body 121 to the electrode assembly 110, and is coupled to the first electrode tab 111a of the electrode assembly 110 through a process such as welding. The first inner connection part 131a3 and the first electrode tab 111a are bent together, in one embodiment, and stored in the storage recess 122a of the body 121.

The first sealing part 133a, in one embodiment, surrounds the first insulating tape 132a wound around the first electrode terminal 131a. The first sealing part 133a seals the space between the first electrode terminal 131a and the body 121, and supports the first electrode terminal 131a. The first sealing part 133a may be formed using a method such as double injection before forming the body 121. To this end, the first sealing part 133a, in one embodiment, is formed of a polymer having a higher melting point than that of the body 121. The first sealing part 133a, in one embodiment, is attached to the first electrode terminal 131a through a first terminal adhesive layer 134a disposed between the first sealing part 133a and the first insulating tape 132a (see FIG. 7). The first sealing part 133a, in one embodiment, is attached to the body 121 through a first body adhesive layer 135a disposed between the first sealing part 133a and the body 121 (see FIG. 7). The first body adhesive layer 135a, in one embodiment, is formed of a same or similar material as a resin material of the body 121, so that the first body adhesive layer 135a is strongly attached to the body 121 when the resin of the body 121 is injected.

The second terminal part 130b includes a second electrode terminal 131b and a second sealing part 133b, and supports the second electrode terminal 131b in the body 121.

The second electrode terminal 131b, in one embodiment, includes a long, thin metal plate. The second electrode terminal 131b, in one embodiment, is electrically connected to the second electrode tab 112a that is a negative electrode tab, so that the second electrode terminal 131b functions as a negative terminal of the secondary battery 100.

The second electrode terminal 131b includes a second outer connection part 131b1, a second insulated part 131b2, and a second inner connection part 131b3 that are sequentially located along a longitudinal direction of the second electrode terminal 131b. The second outer connection part 131b1 extends from the base part 122 of the body 121 to a side opposite the electrode assembly 110, so that the second outer connection part 131b1 can be electrically connected to the protective circuit part (not shown). In one embodiment, a second insulating tape 132b is wound around the second insulated part 131b2 (e.g., between the second insulated part 131b2 and the base part 122 of the body 121) for insulating. The second inner connection part 131b3 extends from the base part 122 of the body 121 to the electrode assembly 110, and is coupled to the second electrode tab 112a of the electrode assembly 110 through a process such as welding. The second inner connection part 131b3 and the second electrode tab 112a are bent together, in one embodiment, and stored in the storage recess 122a of the body 121.

The second sealing part 133b, in one embodiment, surrounds the second insulating tape 132b wound around the second electrode terminal 131b. The second sealing part 133b seals the space between the second electrode terminal 131b and the body 121, and supports the second electrode terminal 131b. The second sealing part 133b may be formed using a method such as double injection before forming the body 121. To this end, the second sealing part 133b, in one embodiment, is formed of a polymer having a higher melting point than that of the body 121. The second sealing part 133b, in one embodiment, is attached to the second electrode terminal 131b through a second terminal adhesive layer 134b disposed between the second sealing part 133b and the second insulating tape 132b (see FIG. 8). The second sealing part 133b, in one embodiment, is attached to the body 121 through a second body adhesive layer 135b disposed between the second sealing part 133b and the body 121 (see FIG. 8). The second body adhesive layer 135b, in one embodiment, is formed of a same or similar material as a resin material of the body 121, so that the second body adhesive layer 135b is strongly attached to the body 121 when the resin of the body 121 is injected.

The external member 140, in one embodiment, has a sheet shape (e.g., a folded or bent sheet shape) and, together with the support body 120, provides a space for receiving the electrode assembly 110. That is, in one embodiment, the external member 140, together with the support body 120, enclose, or surround, the electrode assembly 110. In one embodiment, the external member 140 includes a first portion 140a that is coupled to the first surface 121a of the body 121 and covers the first long side surface 117a of the electrode assembly 110, a second portion 140b that is coupled to the second surface 121b of the body 121 and covers the second long side surface 117b of the electrode assembly 110, and a third portion 140c connecting the first and second portions 140a and 140b that is coupled to the first and second end surfaces 121c and 121d of the body 121 and covers the second end 115b of the electrode assembly 110. The external member 140, in one embodiment, is coupled to the body 121 through heat welding and the adhesive 126 along the first surface 121a, the second surface 121b, the first end surface 121c and the second end surface 121d. For the coupling through heat welding, the width of a part where the adhesive 126 is disposed is less than the widths of parts where the external member 140 is in contact with the first surface 121a, the second surface 121b, the first end surface 121c, and the second end surface 121d of the body 121.

A typical pouch provided to a pouch-type secondary battery may be used for the external member 140. The external member 140 may have a triple-layered structure of a polyolefin layer, an aluminum layer, and a nylon layer. The polyolefin layer may be thermally adhesive to function as a sealant and may be formed of cast polypropylene (CPP). The aluminum layer functions as a base material for maintaining physical strength of the external member 140, and further functions as a barrier layer against moisture and oxygen. The nylon layer functions as a base material and a protective layer.

A secondary battery according to another embodiment of the present invention will now be described with reference to FIG. 9.

Figure 9:
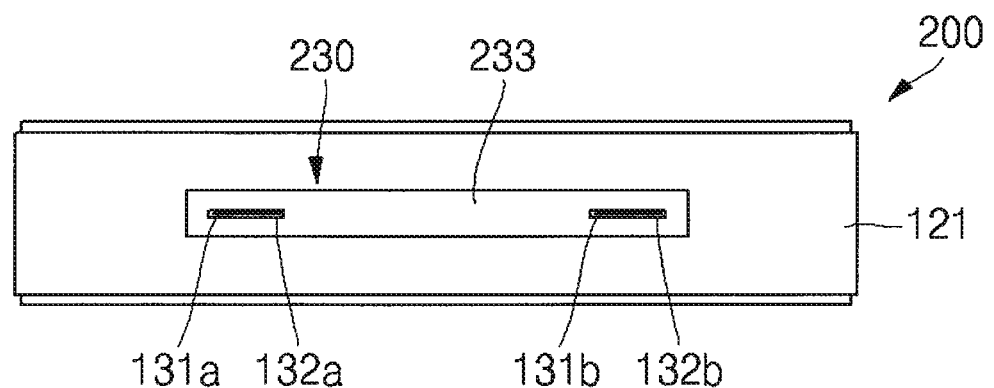
FIG. 9 is a plan view of a secondary battery according to another embodiment of the present invention.

FIG. 9 is a plan view of a secondary battery according to another embodiment of the present invention. Like reference numerals denote like elements throughout the descriptions of the current and previous embodiments. Furthermore, in the current embodiment, descriptions of the like elements will be omitted.

Referring to FIG. 9, a secondary battery 200 includes a terminal forming part 230. Except for the terminal forming part 230, a configuration of the secondary battery 200 is the same as that of the secondary battery 100, and thus, a description thereof will be omitted.

The terminal forming part 230 is integrally formed with the body 121, and includes the first electrode terminal 131a, the first insulating tape 132a surrounding the first electrode terminal 131a, the second electrode terminal 131b, the second insulating tape 132b surrounding the second electrode terminal 131b, and a sealing part 233. Since the rest of the terminal forming part 230 except for the sealing part 233 is the same as the configuration of the previous embodiment, a description thereof will be omitted.

The sealing part 233 surrounds both the first insulating tape 132a wound around the first electrode terminal 131a and the second insulating tape 132b wound around the second electrode terminal 131b. The sealing part 233 seals the space between the first electrode terminal 131a and the body 121 and the space between the second electrode terminal 131b and the body 121, and supports the first electrode terminal 131a and the second electrode terminal 131b. Since the single sealing part 233 is provided with the first and second electrode terminals 131a and 131b, a structure is simplified and a manufacturing process is facilitated.

A secondary battery according to another embodiment of the present invention will now be described with reference to FIG. 10.

Figure 10:
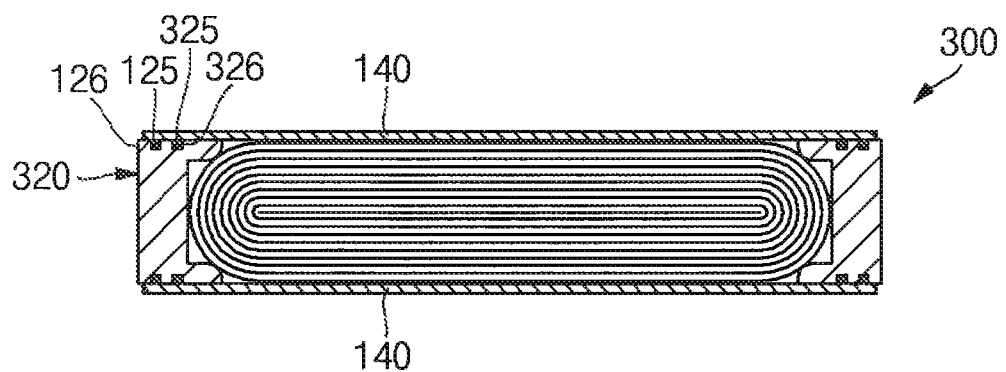
FIG. 10 is a cross-sectional view of a secondary battery according to another embodiment of the present invention.

FIG. 10 is a cross-sectional view of a secondary battery according to another embodiment of the present invention. Like reference numerals denote like elements throughout the descriptions of the current embodiment and the embodiment of FIGS. 1 through 8. Furthermore, in the current embodiment, descriptions of the like elements will be omitted.

Referring to FIG. 10, a secondary battery 300 includes a support body 320 having a second adhesive groove 325. Since the rest of the secondary battery 300 except for the second adhesive groove 325 is the same as the configuration of the secondary battery 100, a description thereof will be omitted.

The second adhesive groove 325 is adjacent and parallel to the first adhesive groove 125. The second adhesive groove 325 receives adhesive 326, which may be the same as the adhesive 126. Adhesives 126 and 326 are applied between the respective first and second adhesive grooves 125 and 325 before the external member 140 is attached. An adhesive remainder generated while the external member 140 is attached is received by the first and second adhesive grooves 125 and 325 on both sides, thus facilitating the attaching of the external member 140.

A secondary battery according to another embodiment of the present invention will now be described with reference to FIG. 11.

Figure 11:
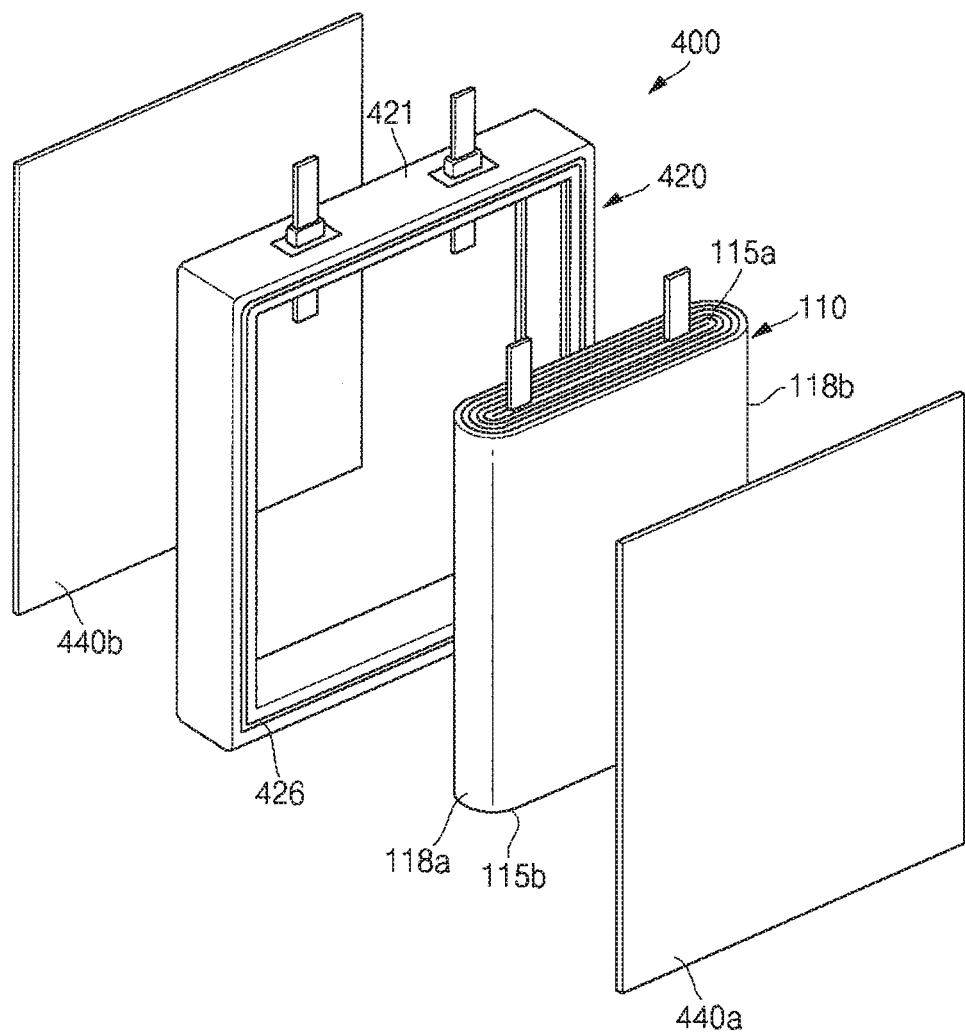
FIG. 11 is an exploded perspective view of a secondary battery according to another embodiment of the present invention.

FIG. 11 is an exploded perspective view of a secondary battery according to another embodiment of the present invention. Like reference numerals denote like elements throughout the descriptions of the current embodiment and the embodiment of FIGS. 1 through 8. Furthermore, in the current embodiment, descriptions of the like elements will be omitted.

Referring to FIG. 11, a secondary battery 400 includes the electrode assembly 110, a support body 420, a first external member 440a, and a second external member 440b. The electrode assembly 110 is described in the embodiment of FIG. 1 and, therefore, will not be described again.

The support body 420 includes a body 421 having a closed shape (e.g., closed on four sides). Since the rest of the support body 420 except for the body 421 is the same or substantially the same as that of the embodiment of FIGS. 1 through 8, a description thereof will be omitted.

The body 421, in one embodiment, has a tetragonal shape, and surrounds the first end 115a, the second end 115b, the first short side surface 118a, and the second short side surface 118b of the electrode assembly 110. An adhesive 426, in one embodiment, is applied on both side surfaces of the body 421.

The first and second external members 440a and 440b are coupled to the side surfaces of the body 421 through the adhesive 426. Since the material of the first and second external members 440a and 440b is the same as that of the external member 140, a description thereof will be omitted.

According to embodiments of the present invention, the support body receiving the electrode assembly is coupled with the external member having a sheet shape, and the terminal parts are integrally formed with the support body. As a result, embodiments of a secondary battery according to the present invention have a simplified structure and improved sealing performance.

In addition, because the inside of the support body is provided with the seat recesses on which portions of the electrode assembly are placed, the electrode assembly is stably supported, and the use of space is improved in embodiments of the present invention.

Furthermore, since the inside of the support body is provided with the storage recess for storing the electrode terminals and the electrode tabs of the electrode assembly, the use of space is promoted in embodiments of the present invention.

Moreover, in embodiments of the present invention, because the seat recesses and the storage recess may store electrolyte, the capacity and service life of the secondary battery can be increased.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A secondary battery comprising:
   an electrode assembly comprising a first electrode, a second electrode, and a separator;
   a support body receiving the electrode assembly and comprising:
      a base portion;
      a first wing portion; and
      a second wing portion, the first and second wing portions extending from opposite ends of the base portion and facing each other and directly contacting at least one of the first electrode, the second electrode, and the separator; and
   an external member comprising a first sheet and a second sheet substantially parallel to the first sheet, the first and second sheets being coupled to the support body,
   wherein the support body and the external member together enclose the electrode assembly, and
   wherein inner surfaces of the first and second wing portions define seat recesses receiving a portion of at least one of the first electrode and the second electrode of the electrode assembly therein.

2. The secondary battery as claimed in claim 1, further comprising an adhesive coupling the external member to the support body.

3. The secondary battery as claimed in claim 2, wherein the support body has a first adhesive groove configured to receive the adhesive and a second adhesive groove substantially parallel to the first adhesive groove.

4. The secondary battery as claimed in claim 2, wherein a width of a first part of the support body where the adhesive is located thereon is less than a width of a second part of the support body where the support body is coupled to the external member.

5. The secondary battery as claimed in claim 4, wherein the second part of the support body comprises a portion without the adhesive thereon, the portion of the second part being coupled to the external member through heat welding.

6. The secondary battery as claimed in claim 1, wherein the first and second wing portions are substantially perpendicular to the base portion.

7. The secondary battery as claimed in claim 1, wherein an end of the first wing portion has a rounded edge, and an end of the second wing portion has a rounded edge.

8. The secondary battery as claimed in claim 1, wherein the electrode assembly comprises first and second ends opposite each other, and first and second sides connecting the first and second ends to each other, and
   the support body has a tetragonal shape surrounding the first and second ends and the first and second sides of the electrode assembly.

9. The secondary battery as claimed in claim 1, wherein the seat recess has a rounded outer edge.

10. The secondary battery as claimed in claim 1, wherein the external member further comprises a third sheet substantially perpendicular to and connecting the first and second sheets.

11. The secondary battery as claimed in claim 1, wherein the external member has a triple-layer structure comprising at least two different materials.

12. The secondary battery as claimed in claim 1, wherein a width of the seat recess is less than an outermost width of the electrode assembly.

* * * * *